(12) United States Patent
Akatsuka et al.

(10) Patent No.: US 9,586,619 B1
(45) Date of Patent: Mar. 7, 2017

(54) MOTOR CONTROLLER

(71) Applicant: DENSO CORPORATION, Kariya, Aichi-pref. (JP)

(72) Inventors: Hisaya Akatsuka, Kariya (JP); Motoaki Kataoka, Kariya (JP); Yasuhiko Mukai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 57 days.

(21) Appl. No.: 15/043,132

(22) Filed: Feb. 12, 2016

(51) Int. Cl.
*A01B 69/00* (2006.01)
*B62D 15/02* (2006.01)

(52) U.S. Cl.
CPC .................. *B62D 15/025* (2013.01)

(58) Field of Classification Search
CPC ................. B60W 10/06; B60W 10/20; B60W 2550/402; B60W 50/029; F02N 11/0818; F02N 11/0822; F02N 2200/062
USPC .......................................................... 701/41
See application file for complete search history.

(56) References Cited

U.S. PATENT DOCUMENTS

2001/0056544 A1* 12/2001 Walker .................... B60R 25/02
  726/2
2002/0087255 A1* 7/2002 Jindo ................. B60K 31/0008
  701/96
2015/0019079 A1* 1/2015 Romanato ........... F02N 11/0822
  701/41
2015/0307105 A1* 10/2015 Huber ................... B60W 50/14
  340/576

FOREIGN PATENT DOCUMENTS

| JP | H09-221053 A | 8/1997 |
| JP | 2002-120744 A | 4/2002 |
| JP | 2004-149080 A | 5/2004 |
| JP | 2015-33942 A | 2/2015 |

* cited by examiner

*Primary Examiner* — Redhwan K Mawari
(74) *Attorney, Agent, or Firm* — Knobbe, Martens, Olson & Bear, LLP

(57) ABSTRACT

A motor controller has an assist controller generating an assist instruction for a generation of an assist torque based on a detection value of a steering torque, a follow controller obtaining a target value of a physical quantity regarding a steering operation and generating a follow instruction, and a motor driver driving, according to a sum of the assist instruction and the follow instruction, a motor that generates the assist torque and an automatic steering toque. In addition, the follow controller changes, according to a degree of intervention by a driver that is detected by an intervention detector, responsiveness of the follow control, making it possible to naturally hand over a motor control to the driver or to a system when the driver or the system intervenes a current control of the motor that generates the assist torque and/or the steering torque.

6 Claims, 11 Drawing Sheets

MOTOR CONTROLLER

CROSS REFERENCE TO RELATED APPLICATION

The present application is based on Japanese Patent Application No. 2013-166294, filed on Aug. 9, 2013, the disclosure of which is incorporated herein by reference.

TECHNICAL FIELD

The present disclosure generally relates to a technique that controls a motor for generating an assist torque for assisting a steering operation and an automatic steering torque for automatically steering a steering wheel.

BACKGROUND INFORMATION

A device disclosed in, for example, a patent document, Japanese Patent Laid-Open No. H09-221053 (Patent document 1) uses one actuator (i.e., a motor) to perform a lane keep control and a power steering control, in which (i) the lane keep control keeps a currently traveling lane (i.e., a travel along a current lane) for a subject vehicle based on an image captured by a forward-looking camera and a recognition of a relationship between the current lane and the subject vehicle and (ii) the power steering control generates the assist torque for assisting the steering operation by a driver.

The above-described device basically performs a drive control of the motor based on a total torque of a power steering torque required for the power steering control and a lane keep torque required for the lake keep control. However, during the lane keep control, an influence of the power steering control is suppressed by multiplying a coefficient, which is between 0 and 1, to the power steering torque, so that the subject vehicle does not easily run away (i.e., "derailed") from the current lane.

When the driver interrupts the lane keep control (i.e., performs an intervening action or a so-called driver override), an actual position and an actual angle of the subject vehicle against a target position and a target angle that are set by the lane keep control respectively increase (i.e., have greater deviations), thereby causing a deviation cancelling toque to be generated by the lane keep control.

Further, the lane keep control has higher responsiveness in comparison to an assist control for coping with an external disturbance (i.e., either for ensuring a robustness or for providing a quick steering, in an order of 1 to 100 Hz (against a 0.1 Hz order of the assist control)).

However, a high responsiveness of the lane keep control may be disruptive to the driver, because the cancelling torque for cancelling the deviation by the driver override may counter the driver's operation of the steering wheel, thereby leaving a wrong feeling for the driver.

Further, when a system intervenes the steering operation by the driver, (e.g., when a danger-avoidance target follow control is performed by the system), high responsiveness of the target follow control may also leave a wrong feeling for the driver because the highly-responsive target follow control automatically steers the steering wheel toward a target control value of the target follow control in an abrupt manner.

SUMMARY

It is an object of the present disclosure to provide a motor controller that switches, without leaving a wrong feeling for a driver, a control of a motor for generating an assist torque and an auto steering torque when a driver or a system intervenes in a current control of the motor.

In an aspect of the present disclosure, a motor controller includes an assist controller generating an assist instruction to generate an assist torque that lightens a steering load based on a detection value of a steering torque, a follow controller obtaining a target value of a physical quantity regarding a steering operation and enabling a detection value of the physical quantity to follow the obtained target value, the following of the detection value of the physical quantity to the obtained target value is achieved by a follow instruction that generates an automatic steering torque, a motor driver driving, according to a summation value of the assist instruction and the follow instruction, a motor that generates the assist torque and the automatic steering torque, and an intervention detector detecting a driver intervention in a follow control by the follow controller or a system intervention in an assist control by a system that involves a generation of the target value of the physical quantity. The follow controller changes a degree of responsiveness of the assist control or the follow control according to a degree of intervention detected by the intervention detector.

Usually, when the follow control by the follow controller has an intervention of the driver (i.e., receives an intervention operation or a "driver override"), the follow controller generated a great follow instruction for cancelling the intervention operation (i.e., for cancelling the torque from the intervention operation which counters the automatic steering torque). Therefore, the higher the responsiveness of the target follow control is, the more difficult it is to perform an intervention operation.

On the other hand, according to the present disclosure, the responsiveness of the target follow control is changed based on the detection results of the intervention detector. Therefore, when the driver intervention is detected during the target follow control (i.e., during a high responsiveness time), the driver intervention is easily performable by lowering the responsiveness of the target follow control. Alternatively, when the system intervention is detected during the assist control (i.e., during a low responsiveness time), the required responsiveness for performing the target follow control is secured by raising the responsiveness of the target follow control.

As described above, the present disclosure enables a seamless and smooth switching of the control between the assist control and the target follow control when such a switching of the control is performed by a driver intervention or by a system intervention.

The numerals in the claims enclosed in parentheses exemplify a relationship between the claim elements and the concrete components in the embodiment, thereby not limiting the scope of the present disclosure.

BRIEF DESCRIPTION OF THE DRAWINGS

Objects, features, and advantages of the present disclosure will become more apparent from the following detailed description made with reference to the accompanying drawings, in which.

DETAILED DESCRIPTION

The embodiment of the present disclosure is described with reference to the drawings.

First Embodiment

Entire Configuration

Figure 1:
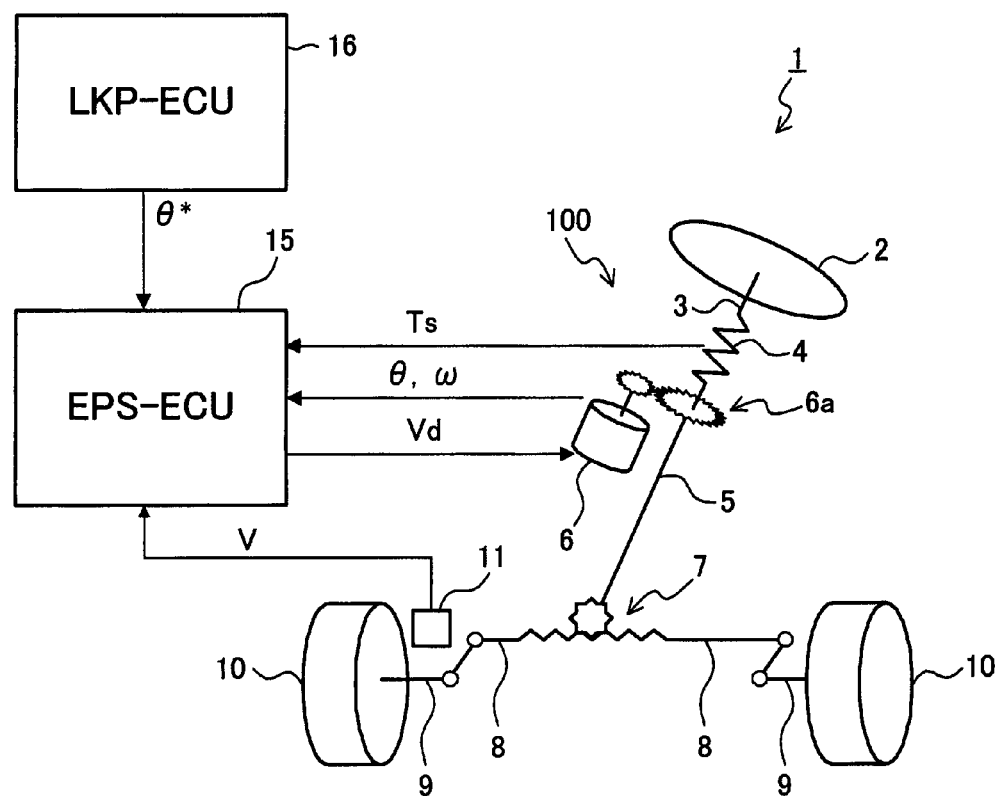
FIG. 1 is a block diagram of a configuration of an electric power steering system in a first embodiment of the present disclosure.

An electric power steering system 1 of the present embodiment is a system, as shown in FIG. 1, for performing an assist control which assists an operation of a steering wheel 2 (i.e., a steering member) by the driver with a motor 6, and/or a target follow control (i.e., Lane Keeping Control (LKC) in this case) that realizes an automatic steering by the motor 6 along a target course set in a travel lane.

The steering wheel 2 is fixed to one end of a steering shaft 3, a torque sensor 4 is connected to the other end of the steering shaft 3, and an intermediate shaft 5 is connected to the other end of the torque sensor 4. In the following description, an entirety from the steering shaft 3 to the intermediate shaft 5 through the torque sensor 4 may collectively be called as a steering shaft.

The torque sensor 4 is a sensor for detecting a steering torque Ts. More practically, the torque sensor 4 includes a torsion bar that connects the steering shaft 3 and the intermediate shaft 5, and the torque currently added to the torsion bar is detected based on an angle of torsion of the torsion bar.

The motor 6 is used for generating an automatic steering torque based on the target follow control, and for generating the assist torque based on assist control. The rotation of the motor 6 is transmitted to the intermediate shaft 5 via a deceleration mechanism 6a. Namely, the deceleration mechanism 6a is made up from the worm gear disposed at the tip of the rotation shaft of the motor 6, and the worm wheel disposed coaxially on the intermediate shaft 5 and engaging with the worm gear, for the transmission of the rotation of the motor 6 to the intermediate shaft 5.

On the contrary, when the intermediate shaft 5 rotates according to the reaction force from the road surface (i.e., a road surface reaction force), or according to an operation of the steering wheel 2, the rotation will be transmitted back to the motor 6 via the deceleration mechanism 6a, and the motor 6 is also rotated.

The motor 6 may be a brushless motor, for example, and has a rotation sensor (e.g., resolver) on an inside. The rotation sensor outputs at least a motor rotation angle θ and a motor rotation angular speed ω. However, instead of using the motor rotation angle θ and the motor rotation angular speed ω, a steering angle and a steering angular speed that are derived by multiplying the angle θ and the angular speed ω with a gear ratio of the deceleration mechanism 6a may also be used.

The other end of the intermediate shaft 5, which is opposite to the end connected to the torque sensor 4, is connected to a steering gear box 7. The steering gear box 7 is a gear system that consists of the rack and pinion gear, and the gear tooth of the rack gear engages with the pinion gear provided on the other end of the intermediate shaft 5.

Therefore, when the driver rotates the steering wheel 2, the intermediate shaft 5 rotates (i.e., the pinion gear is rotated), thereby causing a right-left move of the rack. Each of the both ends of the rack has a tie rod 8 connected to the end of the rack, and the tie rod 8 moves to the right and to the left together with the rack. Thereby, based on such a move of the tie rod 8 pulling a knuckle arm 9 on the end of the rod 8, the direction of each tire 10 is changed for the steering of the vehicle.

Further, a speed sensor 11 for detecting a vehicle speed V is provided on a predetermined part in the vehicle.

In the following, a steering force transmission mechanism from the steering wheel 2 to both of the tires 10 as a whole may be called as a steering mechanism 100.

In the steering mechanism 100 having such a configuration, when the steering wheel 2 rotates by the steering operation of the driver, the rotation is transmitted to the steering gear box 7 via the steering shaft 3, the torque sensor 4, and the intermediate shaft 5. Then, the rotation of the intermediate shaft 5 is changed into the right and left movement of the tie rod 8 in the steering gear box 7, and, according to the movement of the tie rod 8, both of the tires 10 are steered.

Lane Keeping (LKP)-ECU 16 operates on an electric power from a non-illustrated battery, and, based on a front image of the vehicle which is captured by a non-illustrated in-vehicle camera, detects the position of the self vehicle in the travel lane as well as the travel lane itself, and sets a target course based on the detection result.

Further, based on detection values of the vehicle speed and the steering angle, etc., a target angle θ* which is a target value of the motor rotation angle (or a steering angle) for traveling along the target course is set, and the target angle θ* is output to Electric Power Steering (EPS)-ECU 15. A process for setting such a target angle θ* is well-known in the art of the lane keeping control, and a detailed description of such process is omitted from the embodiment.

EPS-ECU 15 operates on an electric power of the in-vehicle battery (not illustrated), and calculates a final instruction TL that is derived from an addition of an assist instruction AC and a follow instruction TC based on the target angle θ* that is calculated by LKP-ECU 16, the steering torque Ts detected by the torque sensor 4, the motor rotation angle θ from the motor 6, the motor rotation angular speed ω, and the vehicle speed V detected by the speed sensor 11, among which the instruction AC is an electric current instruction value for generating the assist torque and the instruction TC is an electric current instruction value for generating the automatic steering torque.

That is, EPS-ECU 15 controls the steering characteristics by the control of the motor 6 based on the drive voltage Vd, and further controls the steering mechanism 100 that is driven by the motor 6.

<EPS-ECU>

Figure 2:
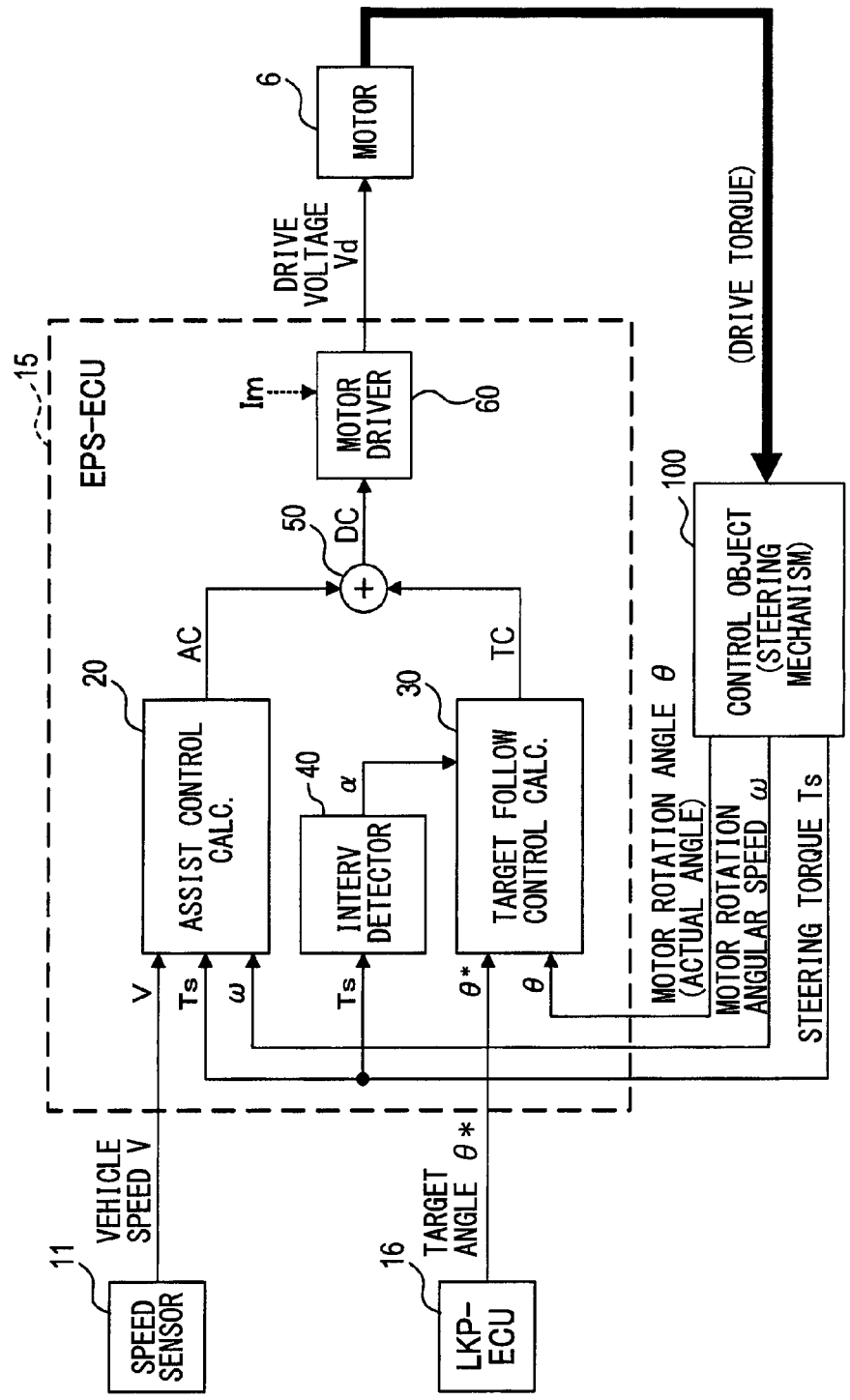
FIG. 2 is a block diagram of a configuration of EPS-ECU.

EPS-ECU 15 includes, as shown in FIG. 2, an assist control calculator 20 that generates the assist instruction AC, a target follow control calculator 30 that generates the follow instruction TC, and an intervention detector 40 that detects an intervention operation by the driver for intervening in the target follow control, an adder 50 that generates a drive instruction DC used as an electric current instruction value for driving the motor 6 by adding the assist instruction AC and the follow instruction TC, and a motor driver 60 (i.e., a driver circuit) that performs, based on the drive instruction DC, a power-supply drive of the motor 6 by applying the drive voltage Vd to the motor 6, which may be applied to each of the three phases when the motor 6 is a three-phase motor.

In the present embodiment, the assist control calculator 20, the target follow control calculator 30, the intervention detector 40, and the adder 50 are respectively realized by a control program that is executed by a Central Processing Unit (CPU) (not illustrated) in EPS-ECU 15. For securely providing responsiveness that is required for the target follow control (i.e., the lane keeping control), the control program is executed at a preset cycle of, for example, 100 μs to 100 ms (i.e., arbitrarily determined based on a requirement of the lane keeping control), and the drive instruction DC is updated at such a preset cycle. The above components realized by the software is only an example, and a part of those components may be realized by the hardware such as a logic circuit.

<<Motor Drive Circuit>>

Based on the drive instruction DC, the motor driver 60 (i.e., a driver circuit) applies the drive voltage Vd to the motor 6 so that the torque (i.e., the assist torque and the automatic steering torque) corresponding to the drive instruction DC is provided to the steering shaft.

More practically, by setting the drive instruction DC as the target value of the electric current, the drive voltage Vd is controlled by a feedback control, for the matching of a supplied electric current Im that is supplied to the motor 6 with the target value of the electric current, and for generating the desired torque for the steering shaft. The motor driver 60 operating in such manner is well-known in the art (e.g., as disclosed in a patent document JP 2013-52793 A), thereby details of such operation are omitted from the present embodiment.

<<Assist Control Calculator>>

The assist control calculator 20 generates the assist instruction AC that represents the electric current instruction value, for generating a feel of transmission of the steering torque according to a road surface reaction force, and for generating a steering feel according to a steering state. The assist instruction AC is generated based on the steering torque Ts, the motor rotation angular speed ω, and the vehicle speed V, so that the steering operation of the steering wheel 2 is assisted in the above-described manner by the resulting assist torque based on the instruction AC.

More practically, a basic assist amount for the feel of transmission according to the road surface reaction force is calculated based on the steering torque Ts and the vehicle speed V, and an assist compensation amount for the steering state is calculated based on the steering torque Ts and the motor rotation angular speed w.

Based on a gain-multiplied assist compensation amount, which may be calculated by multiplying the assist compensation amount by a gain factor in proportion to the vehicle speed V, the assist instruction AC is generated by adding the gain-multiplied assist compensation amount to the basic assist amount. However, a calculation method for calculating the assist instruction AC is not necessarily limited to such an example. That is, the assist instruction AC may be calculated by any known method.

<<Intervention Detector>>

Figure 3:
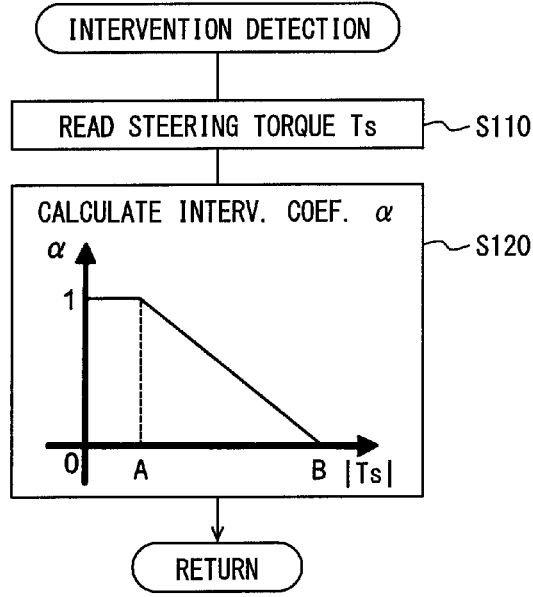
FIG. 3 is a flowchart a process performed by an intervention detector.

The intervention detector 40 reads, as shown in FIG. 3, the steering torque Ts (S110). When reading the torque Ts, the low pass filter (LPF) may be used for removing a noise other than the driver intervention, such as a road surface disturbance or the like riding on the torque Ts, from the steering torque Ts.

Next, by using a predetermined conversion table, an intervention coefficient α according to an absolute value of the steering torque (i.e., |Ts|) is calculated (S120). The intervention detector 40 supplies the calculated intervention coefficient α to the target follow control calculator 30.

The conversion table outputs α=1 when |Ts|≤A, outputs α=0 when |Ts|≥B, and outputs a monotonic decreasing value between α=1 and α=0 according to an increase of |Ts| when A<|Ts|<B.

That is, the intervention detector 40 generates the intervention coefficient α having a smaller value when the absolute value of the steering torque |Ts| increases (i.e., when a degree of intervention in the steering control by the driver is greater).

A range |Ts|≤A defines a dead zone, which prevents a mis-detection of the driver intervention when, for example, the driver unintentionally touches the steering wheel or the like. The value B may, for example, be a threshold for a secure determination that the driver intervention (i.e., the steering torque), is in no doubt determinable as an intentional steering operation.

The absolute value of the steering torque |Ts| used as a parameter of the conversion table in the above discussion may be switched to the steering torque Ts itself, for which the conversion table is simply expanded in a symmetric manner against a Ts=0 axis. Further, for a range of A<|Ts|<B, the decreasing trend of the value of a may not necessarily be a linear decrease but may also be a quadric curve or other known method.

<<Target Follow Control Calculator>>

Figure 4:
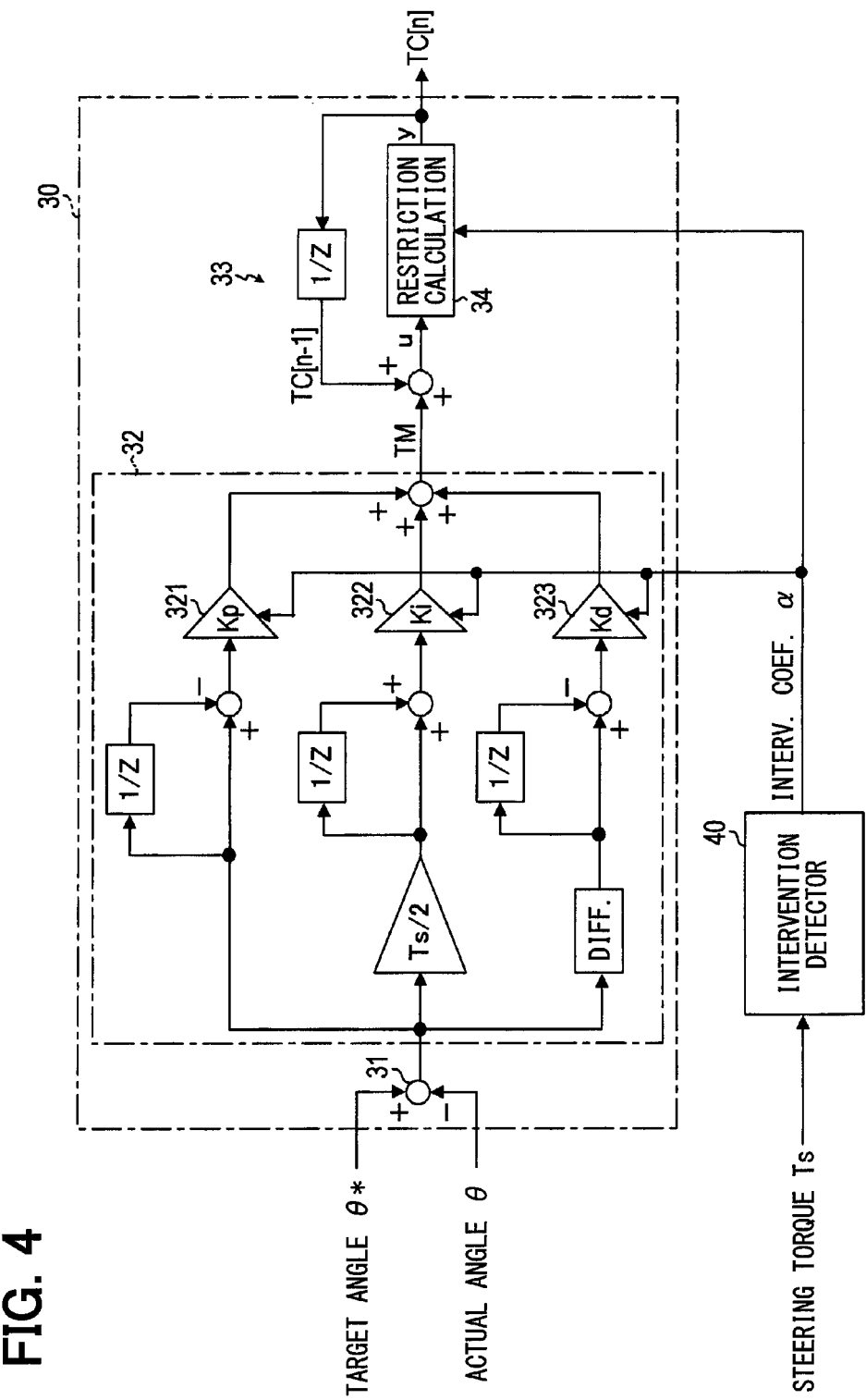
FIG. 4 is a block diagram of a target follow control calculator.

The target follow control calculator 30 generates the follow instruction TC representative of the electric current instruction value for generating the automatic steering torque required for matching (i.e., following or adjusting) a motor rotation angle (i.e., an "actual angle" θ hereafter) to the target angle θ* based on the target angle θ* and the actual angle θ, as shown in FIG. 4.

More practically, the target follow control calculator 30 has a subtractor 31 that calculates a deviation Δθ (=θ*−θ) derived by subtracting the actual angle θ from the target angle θ*, a characteristic determiner 32 that determines the control characteristic by providing a Proportional-Integral-Derivative (PID) gain to the deviation Δθ calculated by the subtractor 31, an integrator 33 that integrates an integration object value TM (i.e., an output of the characteristic determiner 32), and a restriction computer 34 that restricts the follow instruction TC by restricting an internal value used for the calculation in the target follow control calculator 30 according to the intervention coefficient α.

The characteristic determiner 32 and the integrator 33 perform a bilinear transformation for the discretization of the general PID control equation, and for realizing a control structure based on the equation derived from such transformation, which is well-known in the art. Further, the characteristic determiner 32 has a proportional gain provider 321 that provides a gain Kp to a proportional value component proportional to the deviation Δθ, an integral gain provider 322 that provides a gain Ki to an integral value component used for the integration of the deviation Δθ, and a differential gain provider 323 that provides a gain Kd to a differential value component that is a differentiated deviation Δθ. The gains from these gain providers 321-323 are restricted according to the intervention coefficient α (i.e., respectively provided as α×Kp, α×Ki, and α×Kd). The responsiveness of the target follow control improves (i.e., is raised) when the gains from the gain providers 321-323 increase, or lowers when the gains therefrom decrease.

The restriction computer 34 is put in the integrator 33, to which a restriction object value u is provided as an output from an adder that adds the integration object value TM to a previous value TC [n−1] of the follow instruction, and a restricted output y output from the restriction computer 34 then serves as a follow instruction TC [n].

Figure 5:
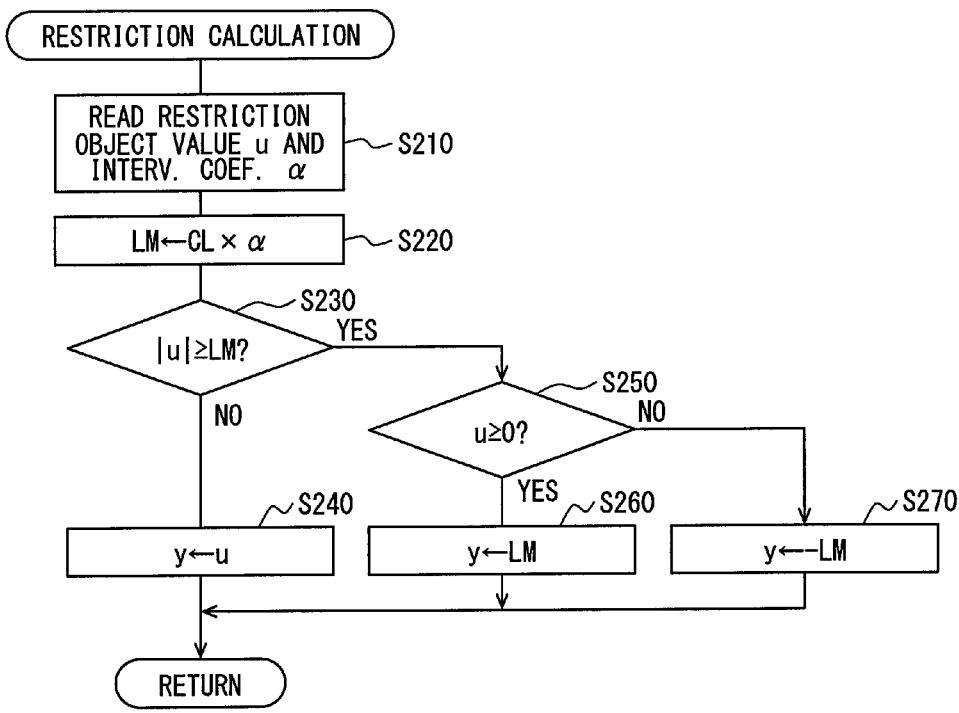
FIG. 5 is a flowchart of a process performed by a restriction computer.

Further, the restriction computer 34, as shown in FIG. 5, first reads the restriction object value u (i.e., an output of the adder constituting the integrator 33) and the intervention coefficient α (S210), and calculates a guard value LM by multiplying an upper limit value CL of the follow instruction, which is set in advance, by the intervention coefficient α (S220). The upper limit value CL is set as a rated electric current of the motor 6, for example.

Next, it is determined whether an absolute value |u| of the restriction object value is equal to or greater than the guard value LM (S230). That is, it is determined whether the restriction object value u exceeds a boundary of −LM to LM range from the guard value, when a boundary value of an allowable range of the follow instruction TC is defined as the guard value ±LM.

When it is determined that the restriction object value u is within the allowable range (i.e., |u|<LM) (S230—NO), the restriction object value u is directly set as the output y (i.e., without restriction (S240)).

When it is determined that the restriction object value u is outside of allowable range (i.e., |u|≥LM) (3230—YES), it is determined whether the restriction object value u is a non-negative value (S250).

When it is determined that the restriction object value u is a non-negative value (3250—YES), the guard value (i.e., the upper limit of the allowable range) LM is set as the output y (S260). When the restriction object value u is a negative value (3250—NO), a negative guard value (i.e., the lower limit of the allowable range)—LM is set as the output y (S270).

<Operation>

Figure 6:
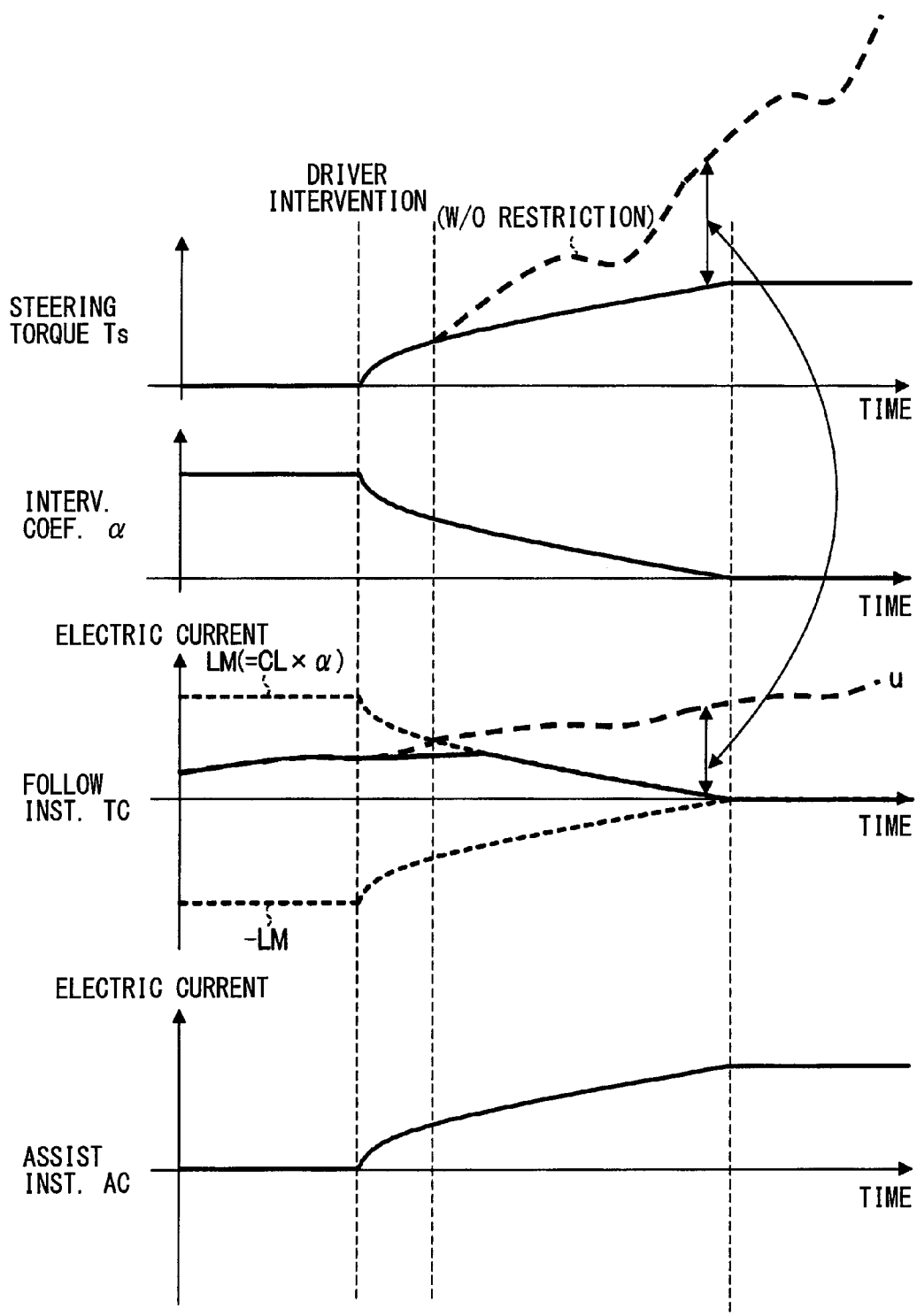
FIG. 6 is a wave form diagram of an example of operation.

As shown in FIG. 6, in the electric steering system 1 configured in the above-described manner, when the target follow control (i.e., the lane keeping control) is performed, the follow instruction TC takes a value of non-zero (usually |TC|<LM). On the other hand, as long as the driver does not provide an intervention, the steering torque Ts and the assist instruction AC are maintained as Ts=0 and AC=0. In such case, since |Ts|<A, the intervention coefficient α is set to 1 (i.e., the allowable range of the follow instruction TC is maximized).

When the driver intervenes in the target follow control by operating the steering wheel 2, the steering torque Ts according to the degree of the intervention operation is generated, leading to a generation of the assist instruction AC according to the generated steering torque Ts and a change of the intervention coefficient α according to the generated steering torque Ts. Then, based on the intervention coefficient α, the allowable range of the follow instruction TC and the PID gain provided by the characteristic determiner 32, which affects a magnitude of the integration object value TM, are restricted.

In such case, if no restriction is performed for the follow instruction TC and for the PID gain, the target follow control generates a large follow instruction TC for countering the intervention operation that acts as an increaser of the deviation Δθ, as shown by a dotted line in FIG. 6. This obliges the driver to operate the steering wheel 2 with a strong force for overriding the follow control.

On the other hand, in the present embodiment, the intervention coefficient α approaches zero as the steering torque Ts increases (i.e., as the degree of intervention of the driver increases), resulting in a smaller PID gain and a narrower allowable range of the follow instruction TC.

When the PID gain becomes small, the responsiveness of the target follow control lowers, and the change of the restriction object value u is suppressed, thereby restricting the generation of the follow instruction TC that acts as a canceller of the overriding. Further, such a restriction starts just after the detection of the driver intervention. In addition, when the absolute value |u| of the restriction object value increases beyond the boundary of the allowable range, the follow instruction TC is restricted within the range of the guard value ±LM. As the degree of the driver intervention becomes greater (i.e., as the intervention coefficient α becomes smaller), the guard value LM approaches zero, enabling a switching from the target follow control to the assist control without operating the steering wheel 2 with a strong force.

<Effect>

As described above, when the electric steering system 1 detects an intervention operation of the driver, a generation of the follow instruction TC that cancels (i.e., tries to cancel), the intervention operation is suppressed by lowering the responsiveness of the target follow control, and the switching from the target follow control to the assist control is facilitated by restricting (i.e., narrowing), the allowable range of the follow control TC in proportion to the degree of the intervention operation, which enables the driver to perform the switching of the control with ease (i.e., with a small operation force). Therefore, when the driver performs the intervention operation, the control is switched from the target follow control to the assist control without leaving a wrong feeling for the driver.

Second Embodiment

The second embodiment is described.

Since the basic configuration of the second embodiment is the same as the first embodiment, the description of the second embodiment is focused on the difference between the two.

In the first embodiment, the target follow control calculator 30 provides a control structure in which the characteristic determiner 32 provides a PID gain to the deviation Δθ between the target angle θ* and the actual angle θ, and the integrator 33 integrates the PID gain provided deviation Δθ.

Figure 7:
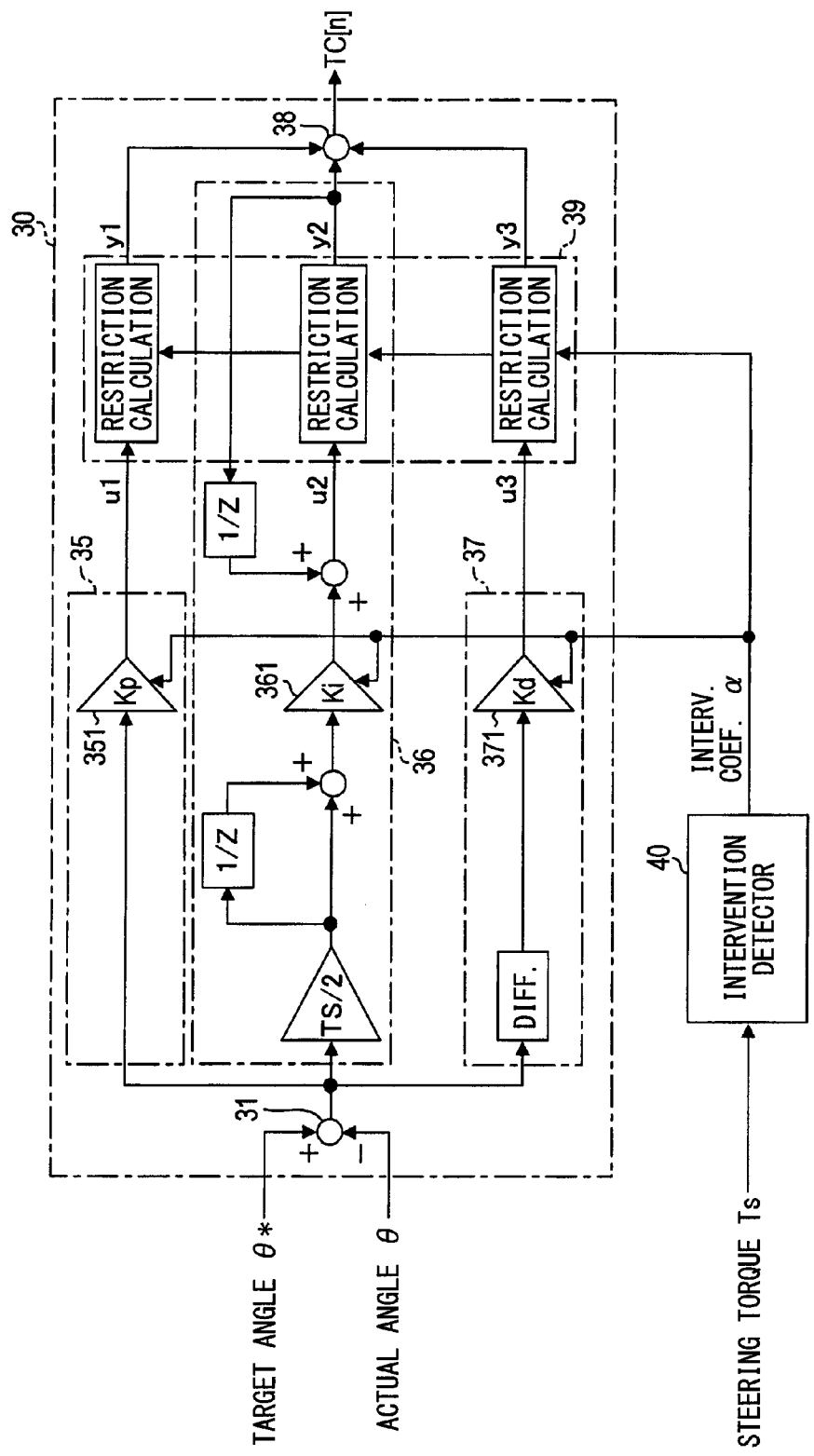
FIG. 7 is a block diagram of a target follow control calculator in a second embodiment of the present disclosure.

On the other hand, the target follow control calculator 30 in the present embodiment has, as shown in FIG. 7, the subtractor 31 that calculates a deviation $\Delta\theta(=\theta^*-\theta)$ derived by subtracting the actual angle $\theta$ from the target angle $\theta^*$, a proportional component computer 35 that calculates a proportional value component of the follow instruction TC based on the deviation $\Delta\theta$, an integral component computer 36 that calculates an integral value component of the follow instruction TC based on the deviation $\Delta\theta$, a differential component computer 37 that calculates a differential value component of the follow instruction TC based on the deviation $\Delta\theta$, an adder 38 that adds the calculated result from each of the computing units 35-37 and calculates the follow instruction TC, and a restriction computer 39 that restricts the follow instruction TC by restricting an internal value used for the calculation in the target follow control calculator 30 according to the intervention coefficient $\alpha$.

Although each of the computing units 35-37 is well-known, the integral component computer 36 may specifically be mentioned as follows. That is, the integral component computer 36 performs a bilinear transformation for the discretization of the general integration control equation, and for realizing a control structure based on the equation derived from such transformation, which are well-known in the art.

Further, the proportional component computer 35 has a proportional gain provider 351 that provides a gain Kp to the proportional value component, the integral component computer 36 has an integral gain provider 361 that provides a gain Ki to the integral value component, and the differential component computer 37 has a differential gain provider 371 that provides a gain Kd to the differential value component. The gains of these gain providers 351,361,371 are restricted according to the intervention coefficient $\alpha$, and more specifically, respectively provided as $\alpha \times Kp$, $\alpha \times Ki$, and $\alpha \times Kd$. The responsiveness of the target follow control improves (i.e., is raised) when the gains from the gain providers 321-323 increase, or lowers when the gains from the gain providers 321-323 decrease.

The restriction computer 39 is put in a control structure so as (i) to receive an output of the proportional component computer 35 as a restriction object value u1, (ii) to receive an output of the differential component computer 37 as a restriction object value u3, and (iii) to receive, in the integral component computer 36, an output of the adder as a restriction object value u2. The restriction computer 39 also yields outputs y1, y2, y3 respectively from the proportional computer 35, differential component computer 37, and integral component computer 36. Outputs y1, y2, y3 are to be supplied to the adder 38 as three pieces of input.

Figure 8:
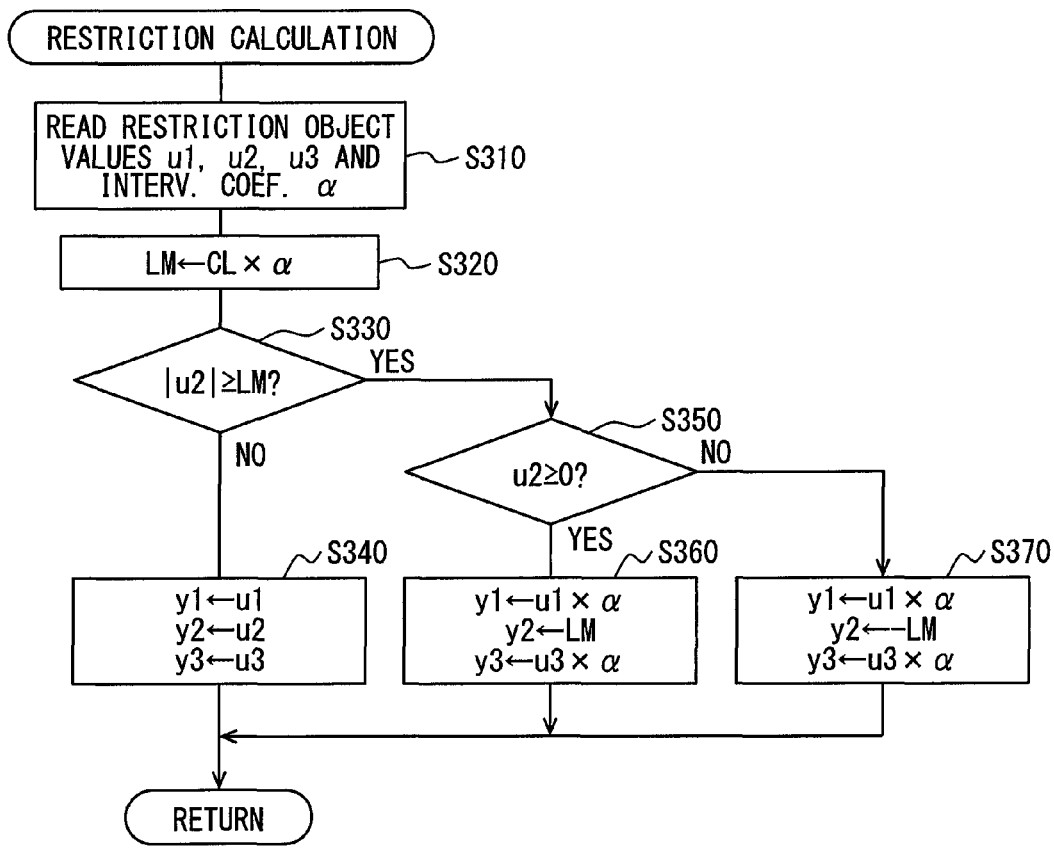
FIG. 8 is a flowchart of a process performed by the restriction computer in the second embodiment of the present disclosure.

Then, the restriction computer 39, as shown in FIG. 8, first reads the restriction object values u1 to u3 and the intervention coefficient $\alpha$ (S310), and calculates the guard value LM by multiplying the upper limit value CL by the intervention coefficient $\alpha$ (S320).

Next, it is determined whether an absolute value of the restriction object value u2 (i.e., an internal value of the integration calculation), (i.e., |u2|) is equal to or greater than the guard value LM (S330).

When |u| is <LM (3330—NO), the restriction object value u1-u3 are set as they are (i.e., without restriction) as outputs y1 to y3 (S340).

When |u| LM (3330—YES), it is determined whether the restriction object value u2 is a non-negative value (S350).

When it is determined that the restriction object value u2 is a non-negative value (S350—YES), the restriction object values u1 and u3 are multiplied by the intervention coefficient $\alpha$ to have the outputs y1 and y3, and the guard value (i.e., the upper limit of allowable range) LM is set as the output y3 (S360).

When it is determined that the restriction object value u2 is a negative value (3350—NO), the restriction object values u1 and u3 are multiplied by the intervention coefficient $\alpha$ to have the outputs y1 and y3, and a negative guard value (i.e., the lower limit of allowable range)—LM is set as the output y3 (S370).

<Effect>

According to the present embodiment, just like the first embodiment, when the intervention operation by the driver is detected, a generation of the follow instruction TC, which cancels or tries to cancel the intervention operation, is suppressed by lowering the responsiveness of the target follow control. The switching from the target follow control to the assist control is facilitated by restricting (i.e., narrowing) the allowable range of the follow control TC in proportion to the degree of the intervention operation, thereby achieving the same effect as the first embodiment.

Third Embodiment

The third embodiment is described.

Since the basic configuration of the third embodiment is the same as the first embodiment, the description of the third embodiment is focused on the difference between the two.

In the first embodiment, the intervention detector 40 calculates the intervention coefficient $\alpha$ according to the steering torque Ts.

Figure 9:
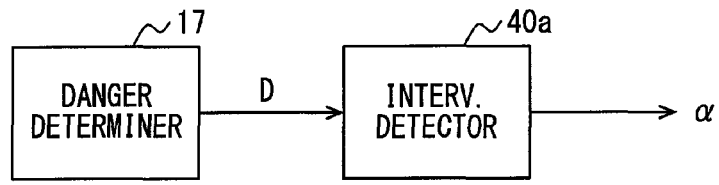
FIG. 9 is a block diagram of the intervention detector and a connected component in a third embodiment of the present disclosure.

On the other hand, in the present embodiment, as shown in FIG. 9, the intervention detector 40a generates the intervention coefficient $\alpha$ according to a degree of dangerousness D (i.e., may also be designated as a degree of danger D hereafter in the specification and in the drawing), which is a determined result of a danger determiner 17. In this case, a value D always takes a positive value.

<Danger Determiner>

The danger determiner 17 determines the degree of danger D based on, for example, a stop control execution request flag from a Pre-Crash Safety system (PCS), a rain determination by a rain sensor, a brightness determination by a brightness sensor and the like. These are information about a vehicle safety collected from various sensors and control systems of well-known type. There are various ways of calculating the degree of danger D. The details of how to calculate the degree of danger D is not discussed here. Here, the lower the safety level is, the higher the degree of danger D becomes.

<Intervention Detector>

Figure 10:
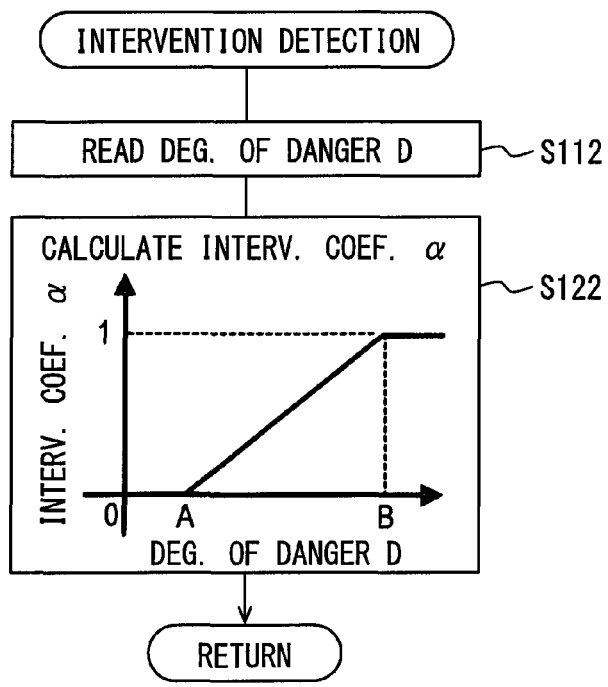
FIG. 10 is a flowchart of a process performed by the intervention detector in the third embodiment of the present disclosure.

As shown in FIG. 10, the intervention detector 40a reads the degree of danger D (S112), and calculates the intervention coefficient $\alpha$ according to the degree of danger D with the conversion table prepared in advance (S122).

Then, the intervention detector 40a supplies the intervention coefficient $\alpha$ to the target follow control calculator 30.

Here, the conversion table used for the calculation of the intervention coefficient $\alpha$ outputs $\alpha=0$ when $D \le A$, and outputs $\alpha=1$ when $D \ge B$, and outputs a monotonously-increasing value between $\alpha=0$ and $\alpha=1$ when $A<D<B$. In other words, the intervention detector 40a generates the intervention coefficient $\alpha$ in a manner in which, the greater the degree of danger D is (i.e., when the degree of system intervention is great), the greater the intervention coefficient $\alpha$ becomes. The values A and B are the same as the ones described in the first embodiment.

<Target Follow Control Calculator>

The target follow control calculator 30 operates like the one in the first embodiment, except for use of (1−α) instead of α in the restriction computer 34.

<Operation>

In the present embodiment, the intervention detector 40a determines the intervention coefficient as α=0 when the degree of danger D is D≤A during the steering operation performed by the driver, which leads to the follow instruction being set to TC=0, thereby resulting in that only an assist control is performed.

When the degree of danger D is A<D<B, the intervention coefficient α is set as a value between 0 and 1 according to the degree of danger D. That is, according to an increase of the degree of danger D, the ratio between the assist torque from the assist control, and the automatic steering torque from the target follow control is lowered, thereby the degree of system intervention in the driver's steering increases.

When the degree of danger D is D≥B, the intervention coefficient is set to α=1, which is the target follow control only, by the exclusion of the driver intervention.

<Effect>

According to the present embodiment, when steering by the driver is performed (i.e., when the assist control is performed), if the detected degree of danger D increases, the target follow control is prioritized for collision avoidance or the like by increasing the degree of responsiveness of the target follow control, thereby preventing the driver from performing a dangerous steering.

Further, since the allowable range of the follow instruction TC is restricted according to the degree of danger D, the ratio of the follow instruction TC is increased for a greater degree of danger D, thereby enabling the switching of control without leaving a wrong feeling for the driver.

Fourth Embodiment

The fourth embodiment has the same basic configuration as the first embodiment. Thereby, the description of the fourth embodiment is focused on the difference between the two.

In the first embodiment, the intervention detector 40 calculates the intervention coefficient α according to the steering torque Ts.

Figure 11:
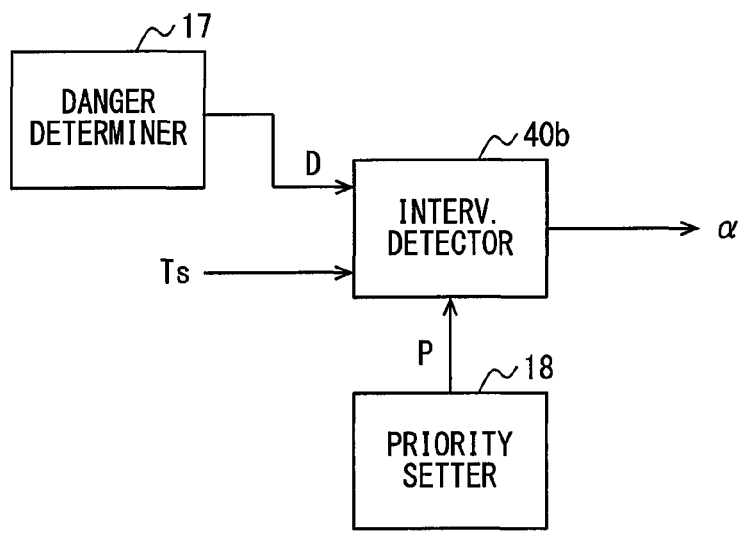
FIG. 11 is a block diagram of the intervention detector and the connected component in a fourth embodiment of the present disclosure.

On the other hand, in the present embodiment, as shown in FIG. 11, the intervention detector 40b generates the intervention coefficient α based on the steering torque Ts, the degree of danger D (which is a determination result of the danger determiner 17), and a priority P (which is a setting by a priority setter 18).

The danger determiner 17 is the same as the one described in the third embodiment. Therefore, no description is provided in the present embodiment about the danger determiner 17.

<Priority Setting Part>

The priority setter 18 sets the priority P (i.e., a degree of priority) regarding how much degree either the manual steering by the driver (i.e., the assist control) or the automatic steering by the system (i.e., the target follow control) is prioritized over the other. The priority P may be a fixed value, or may be a variable based on a change speed of the degree of danger D and/or a motor speed ω. The priority P is within a range between 0 and 1 (i.e., 0≤P≤1). Here, the greater the value of P is, the more prioritized the driver operation is.

<Intervention Detector>

Figure 12:
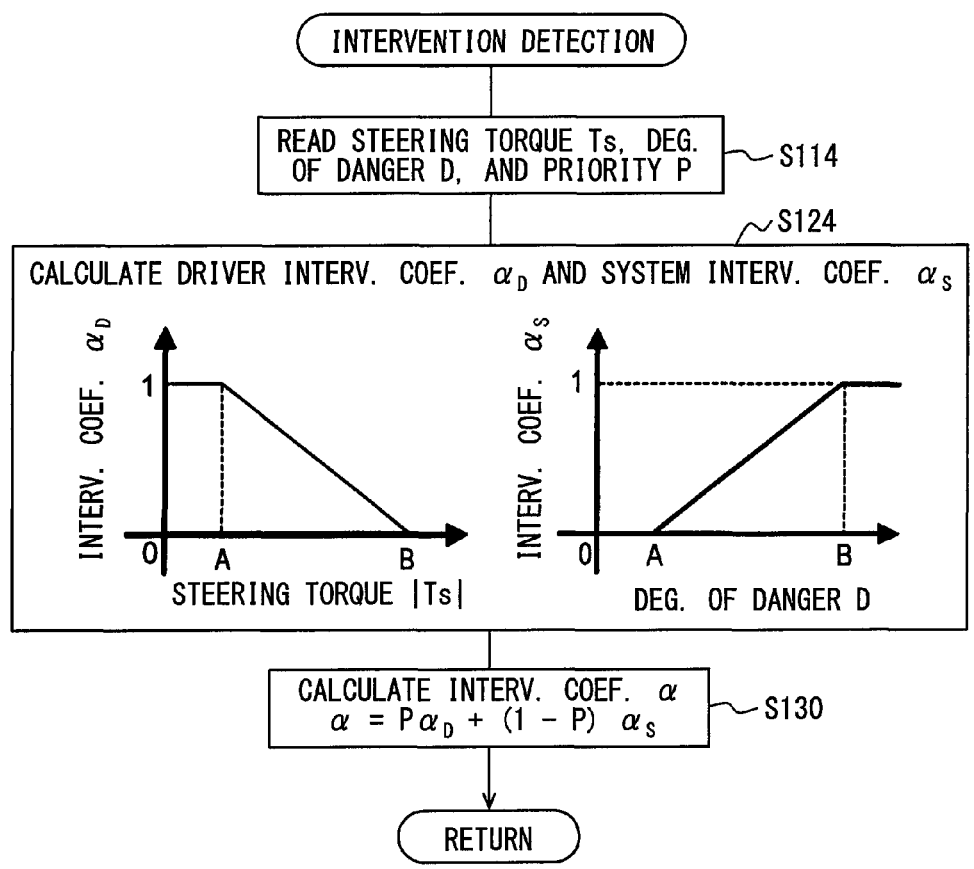
FIG. 12 is a flowchart of a process performed by the intervention detector in the fourth embodiment of the present disclosure.

The intervention detector 40b reads the degree of danger D and the priority P (S114), as shown in FIG. 12.

Then, according to the conversion table prepared in advance, the intervention detector 40b calculates a driver intervention coefficient $\alpha_D$ according to the steering torque Ts and a system intervention coefficient $\alpha_S$ according to the degree of danger D (S124).

The conversion table used for the calculation of the driver intervention coefficient $\alpha_D$ is the same as that of the intervention coefficient α in the first embodiment (refer to FIG. 3), and the conversion table used for the calculation of system intervention coefficient $\alpha_S$ is the same as that of the intervention coefficient α in the third embodiment (refer to FIG. 10). In other words, the greater the absolute value of the steering torque Ts is, the smaller the driver intervention coefficient $\alpha_D$ is. Also, the greater the degree of danger D is, the greater the system intervention coefficient $\alpha_S$ is.

Then, the intervention detector 40b calculates the intervention coefficient α according to the driver intervention coefficient $\alpha_D$, the system intervention coefficient $\alpha_S$, and the priority P (S130), by using an equation 1.

$$\alpha = P\alpha_D + (1-P)\alpha_S \quad \text{(Equation 1)}$$

Then, the intervention detector 40b supplies the intervention coefficient α to the target follow control calculator 30.

<Effect>

According to the present embodiment, since the driver intervention and the system intervention are arbitrated by using the priority P, the switching between the assist control and the target follow control is seamlessly performed, without leaving a wrong feeling for the driver.

Fifth Embodiment

The fifth embodiment has the same basic configuration as the first embodiment, thereby the description of the fifth embodiment is focused on the difference between the two.

According to the first embodiment, the intervention detector 40 calculates the intervention coefficient α from the steering torque Ts by using a single conversion map.

On the other hand, in the present embodiment, the conversion map is switched between two cases (i.e., for the driver intervention, at a time of switching from the target follow control to the assist control; and for the system intervention, at a time of switching from the assist control to the target follow control).

<Intervention Detector>

Figure 13:
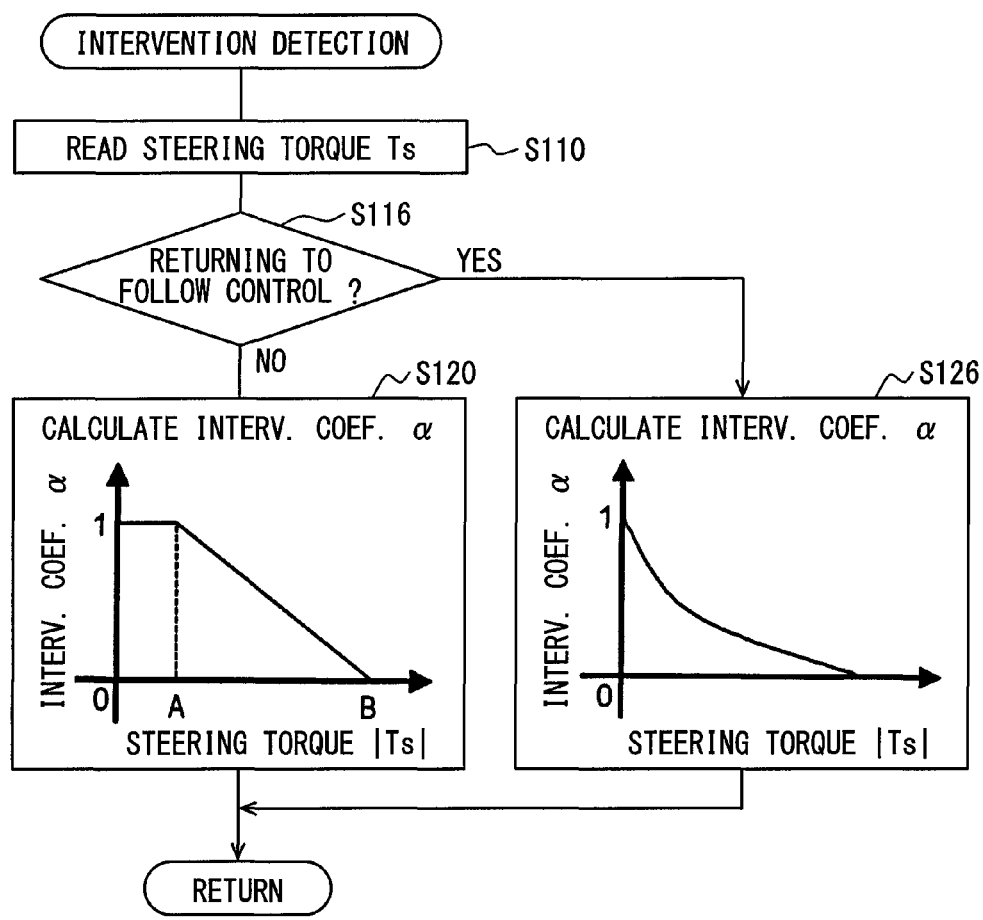
FIG. 13 is a flowchart of a process performed by the intervention detector in a fifth embodiment of the present disclosure.

As shown in FIG. 13, first, the intervention detector 40 reads the steering torque Ts (S110), and determines whether a control state of the assist control and the target follow control is returning to the target follow control (S116).

The determination about the returning to the target follow control is performed based on, for example, a sign inversion timing when a sign of a differentiation value (i.e., a change speed) of the torque Ts detected by the torque sensor 4 is inverted; or a control switch timing when the restriction by the restriction computer 34 is switched from no restriction to restriction (i.e., in FIG. 5, YES of S230 is switched to NO), or more practically, a preset period of time after the sign inversion timing or the control switch timing (e.g., couple of seconds to dozens of seconds).

When it is determined that the control state is not returning to the target follow control (S116—NO), the intervention detector 40 calculates the intervention coefficient α according to a prepared-in-advance normal conversion table (S120). The conversion table in this case is the same as that used in the first embodiment (refer to FIG. 3).

On the other hand, when it is determined that the control state is returning to the target follow control (S116—YES), the intervention coefficient α is calculated according to a prepared-in-advance returning control conversion table based on the steering torque Ts read in S110 (S126).

Then, the intervention detector 40 supplies the intervention coefficient α calculated in S120 or S126 to the target follow control calculator 30.

Here, the conversion table for the returning is α=1 when |Ts|=0, α=0 when |Ts|≥B, or, in a range of 0<|Ts|<B, the value a increases exponentially or in an inversely-proportional manner as the value |Ts| decreases.

That is, when a control state in which the assist control by the driver intervention is prioritized is returning to the target follow control due to the release from the assist control, the absolute value of the steering torque |Ts| changes to have a smaller value. At such time, by using the conversion table for the returning, the increase of the intervention coefficient α becomes less steep than by using the normal conversion table.

<Effect>

According to the present embodiment, the returning to the highly-responsive target follow control is performed gently and less suddenly, a sudden automatic steering toward the target value of the target follow control is suppressed, and the switching to the target follow control from the assist control is enabled without leaving a wrong feeling for the driver.

Sixth Embodiment

The sixth embodiment has the same basic configuration as the fifth embodiment, thereby the description of the sixth embodiment is focused on the difference between the two.

In the fifth embodiment, when returning to the target follow control, the intervention detector 40 calculates the intervention coefficient α from the steering torque Ts by using a conversion map for a return control, which is different from a normal conversion map.

On the other hand, in the present embodiment, instead of switching the conversion map, the calculated intervention coefficient α based on a conversion map is further passed to a low pass filter, which achieves the same effect as the conversion map for the return control.

<Intervention Detector>

Figure 14:
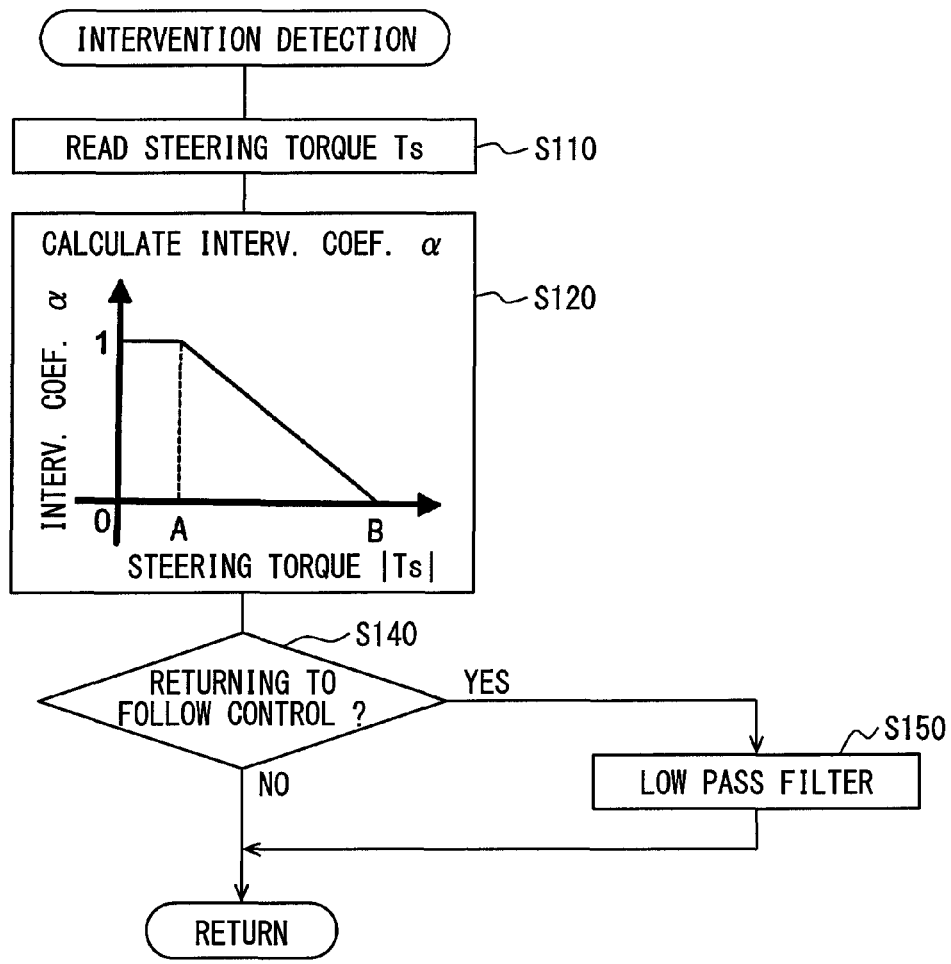
FIG. 14 is a flowchart of a process performed by the intervention detector in a sixth embodiment of the present disclosure.

As shown in FIG. 14, the intervention detector 40 reads the steering torque Ts (S110), and calculates the intervention coefficient α according to the steering torque Ts read in S110 by using the conversion table prepared in advance (S120).

The control state of the assist control and the target follow control is then determined depending on whether the control state is returning to the target follow control (S140). The determination of whether the control state is returning to the target follow control is the same as that of the process in S116 of the fifth embodiment.

When it is determined that the control state is not returning to the target follow control (S140—NO), the calculation result of S120 is outputted as is (i.e., without change as the intervention coefficient α as it is).

When it is determined that the control state is returning to the target follow control (S140—YES), the calculation result of S120 is further passed on to the low pass filter, and an output from the low pass filter is used as the intervention coefficient α (S150).

The low pass filter has a cut-off frequency of 0.1 Hz or the like, which represents an average steering speed of the drivers.

<Effect>

According to the present embodiment, the number of conversion maps is reduced in comparison to the fifth embodiment. Therefore, the same effect is achieved with a decreased calculation load.

The cut-off frequency of the low pass filter may be changed according to the degree of danger D described by the third embodiment etc., for example. More specifically, the cut-off frequency may be raised as the degree of danger D increases. Further, when the degree of danger D takes the maximum value, the low pass filtering may be skipped. In such manner, when the vehicle is in a dangerous state in which the avoidance of the danger by the steering operation of the driver is difficult, the control is quickly returned to the target follow control.

Other Embodiments

As mentioned above, although the embodiments of the present disclosure are described, various modifications and other schemes may also be included in the embodiments of the present disclosure.

(1) Although the lane keeping control is performed as the target follow control in the above-mentioned embodiment, other controls for generating the automatic steering torque may also be performable by the present disclosure. For example, the control may also be based on the motor rotation angle, the steering rotation angle, a detection value from a yaw rate sensor, a deviation between the tire steer angle and a target steer angle, a lateral deviation of position between a target position and a detected position from a camera, a laser radar, a millimeter wave radar or the like, a deviation between a target locus and a detected locus from GPS or the like, a deviation of curvature between a target value and an actual road curvature or the like.

(2) According to the above-mentioned embodiment, although the driver intervention is detected based on a steering torque (i.e., based on an output of the torque sensor), the driver intervention may be detected differently.

For example, the driver intervention may be detected based on a deviation between the target value and the detection value in the target follow control, or based on a combination of such deviation and at least one of the motor rotation angular speed and the output of the torque sensor, etc.

(3) According to the above-mentioned embodiment, the target follow control calculator 30 is provided with the characteristic determiner 32 and the integrator 33, and the characteristic determiner 32 is configured to provide a gain which determines the control characteristic of PID control. However, the control characteristic may be determined differently.

For example, the characteristic determiner 32 may be implemented as a phase advance-retardation compensator, or may be implemented as a controller that is designed for performing a H cc control. That is, as long as the gain of the characteristic determiner 32 is restricted by the intervention coefficient α, such configuration is usable.

(4) According to the above-mentioned embodiment, not only the responsiveness of the target follow control is changed according to the intervention coefficient α, but the follow instruction TC is also restricted by using the restriction computer 34. However, the restriction by the restriction computer 34 may be omitted, and change of the responsiveness of the target follow control may only be performed.

(5) According to the above-mentioned embodiment, the restriction computer 34 calculates the guard value LM from the intervention coefficient α, and when the restriction object value u is within the allowable range between −LM and LM, the restriction object value u is output as it is, and when the restriction object value u is out of boundary of the allowable range, the restriction object value u is restricted either one of ±LM, to be output as the output y.

The calculation by the restriction computer 34 is not limited to the above. For example, the calculation may simply be a multiplication of the restriction object value u with the intervention coefficient α, for yielding the output y.

(6) In the above-mentioned embodiment, the restriction computer 34 is configured as having the integrator 33 that has an output from the adder as the restriction object value u, and as outputting the output y to serve as the follow instruction TC. However, the following (a) to (c) configurations may also be adoptable. In each of the (a) to (c) configurations, the result of addition by the adder in the integrator 33 may be controlled to be within the allowable range of the follow instruction TC (i.e., within a range of −LM to LM), based on the control of the restriction object value u.

(a) The output of the characteristic determiner 32 may directly (i.e., without feedback from 1/Z in FIG. 4) serve as the restriction object value u, and the output y may serve as the integration object value TM supplied to the adder in the integrator 33.

(b) The output of the subtractor 31 may serve as the restriction object value u, and the output y may serve as an input of the characteristic determiner 32.

(c) The target angle θ* and the actual angle θ may serve as the restriction object values u1 and u2, and the outputs y1 and y2 may serve as an input of the subtractor 31.

(7) Although the restriction computer 34 is disposed in the target follow control calculator 30 according to the above-mentioned embodiment, the restriction computer 34 may be disposed in the assist control calculator 20, or in both the assist control calculator 20 and the target follow control calculator 30.

In other words, the restriction computer may be disposed at an arbitrary position as long as the restriction computer is configured to output a restricted follow instruction TC, or a restricted assist instruction AC in a manner in which a ratio of the assist torque against the automatic steering torque takes a greater value when the steering torque Ts (i.e., the driver intervention) is greater, and a ratio of the above takes a smaller value when the degree of danger D (i.e., the system intervention) takes a greater value.

(8) Although the restriction of the follow instruction TC is performed by using the intervention coefficient α that is used for the control of the responsiveness, such a restriction may be performed by using a different coefficient.

(9) Although the intervention coefficient α is calculated according to the steering torque Ts or according to the degree of danger D in the above-mentioned embodiment, the coefficient α may be calculated differently. For example, by providing an abnormality detector for detecting a system abnormality, the intervention coefficient α may be configured to take a smaller value as the degree of detected abnormality takes a greater value (i.e., the same characteristic wave form as shown in FIG. 6 for the first embodiment), and the responsiveness of the target follow control may be controlled accordingly.

In such case, the abnormality detector may output a greater degree of abnormality when the detected abnormality in, for example, a target angular speed instruction value θ* continues for a longer period of time (i.e., when an over-the-threshold abnormal value θ* continues for a long time).

(10) In the above-mentioned embodiment, a function of one element may be distributively provided by two or more elements, or a function provided by many elements may be integrally provided by one element. Further, a part of the configuration in the above embodiment may be replaced with a function of a well-known configuration. Further, a part of the configuration in the above embodiment may be added to or replaced with the configuration in other embodiments in the above.

(11) The present disclosure may be realizable in various forms, for example, as a system having the motor controller as its component, as a program for operating a computer as each of the elements of the motor controlling, or as a method for controlling a motor.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A motor controller comprising:
an assist controller generating an assist instruction to generate an assist torque that lightens a steering load based on a detection value of a steering torque;
a follow controller obtaining a target value of a physical quantity regarding a steering operation and enabling a detection value of the physical quantity to follow the obtained target value, the following of the detection value of the physical quantity to the obtained target value is achieved by a follow instruction that generates an automatic steering torque;
a motor driver driving, according to a summation value of the assist instruction and the follow instruction, a motor that generates the assist torque and the automatic steering torque; and
an intervention detector detecting a driver intervention in a follow control by the follow controller or a system intervention in an assist control by a system that involves a generation of the obtained target value of the physical quantity, wherein
the follow controller changes a degree of responsiveness of the assist control or the follow control according to a degree of intervention detected by the intervention detector.

2. The motor controller of claim 1, wherein
the intervention detector detects the driver intervention in the follow control, and
the follow controller lowers the degree of responsiveness of the follow control in proportion to an increase of the degree of intervention detected by the intervention detector.

3. The motor controller of claim 1, wherein
the intervention detector detects the system intervention in the assist control, and
the follow controller raises the degree of responsiveness of the assist control in proportion to an increase of the degree of intervention detected by the intervention detector.

4. The motor controller of claim 1 further comprising:
an abnormality detector detecting abnormality of the obtained target value of the physical quantity or abnormality of the system, wherein
the follow controller changes the degree of responsiveness of the follow control or the assist control.

5. The motor controller of claim 1 further comprising:
a deviation calculator calculating a deviation between the obtained target value of the physical quantity and the detected value of the physical quantity;
an instruction value generator generating an instruction value of the follow instruction based on a combination of (i) a deviation component in proportion to the deviation, (ii) an integral component from an integration of the deviation, and (iii) a differential component from a differentiation of the deviation, wherein
the instruction value generator changes the degree of responsiveness of the follow control or the assist control by changing a gain that is assigned to the deviation component, the integral component, or the differential component.

6. The motor controller of claim 1 further comprising:
a restrictor restricting an internal value in a controlee that includes at least one of the assist controller and the follow controller according to a degree of the driver intervention detected by the intervention detector, the restriction of the internal value causing a change of ratio of the assist torque against the automatic steering torque.

* * * * *